Dec. 20, 1932.  E. M. PENDLETON  1,891,834
AUTOMOBILE LUNCH TABLE
Filed April 15, 1932   2 Sheets-Sheet 1
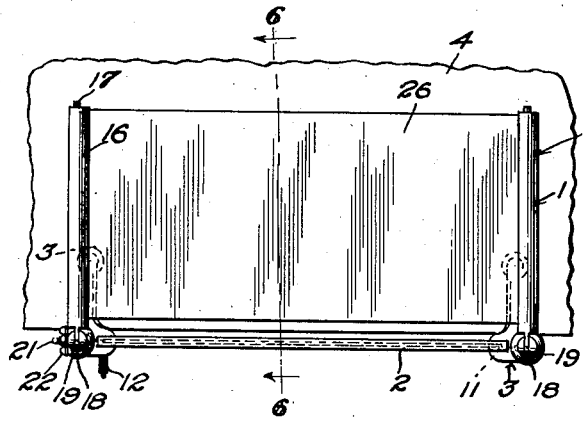
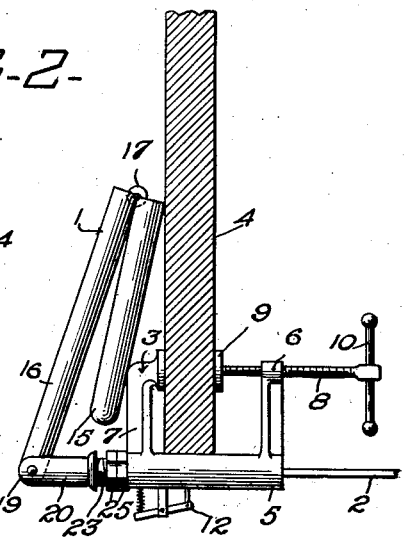
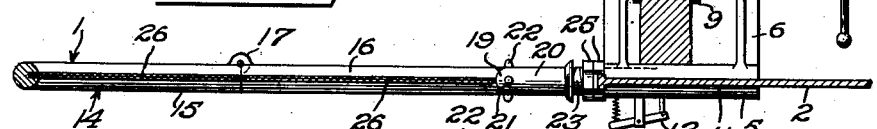
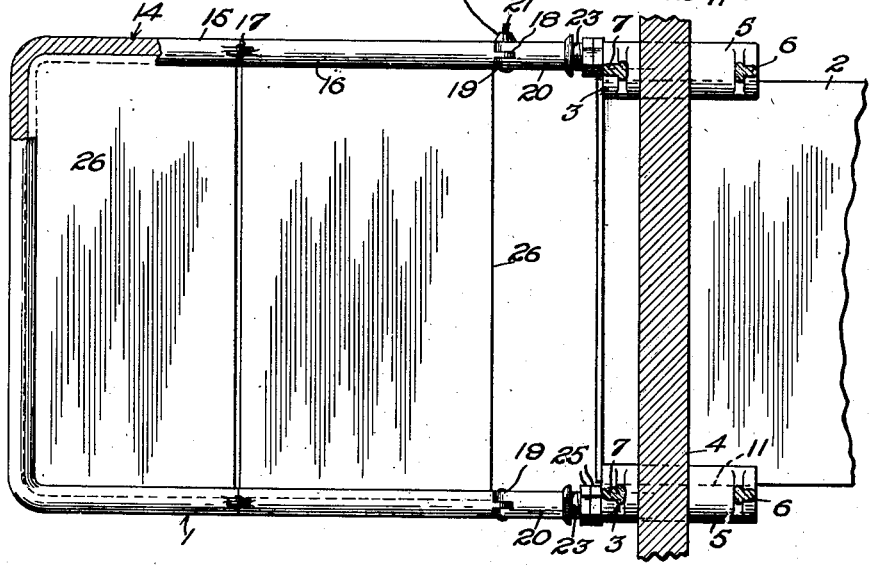
Eldridge M. Pendleton, INVENTOR
BY Victor J. Evans & Co.
ATTORNEY
WITNESS: H. P. Meader Dec. 20, 1932.   E. M. PENDLETON   1,891,834
AUTOMOBILE LUNCH TABLE
Filed April 15, 1932   2 Sheets-Sheet 2
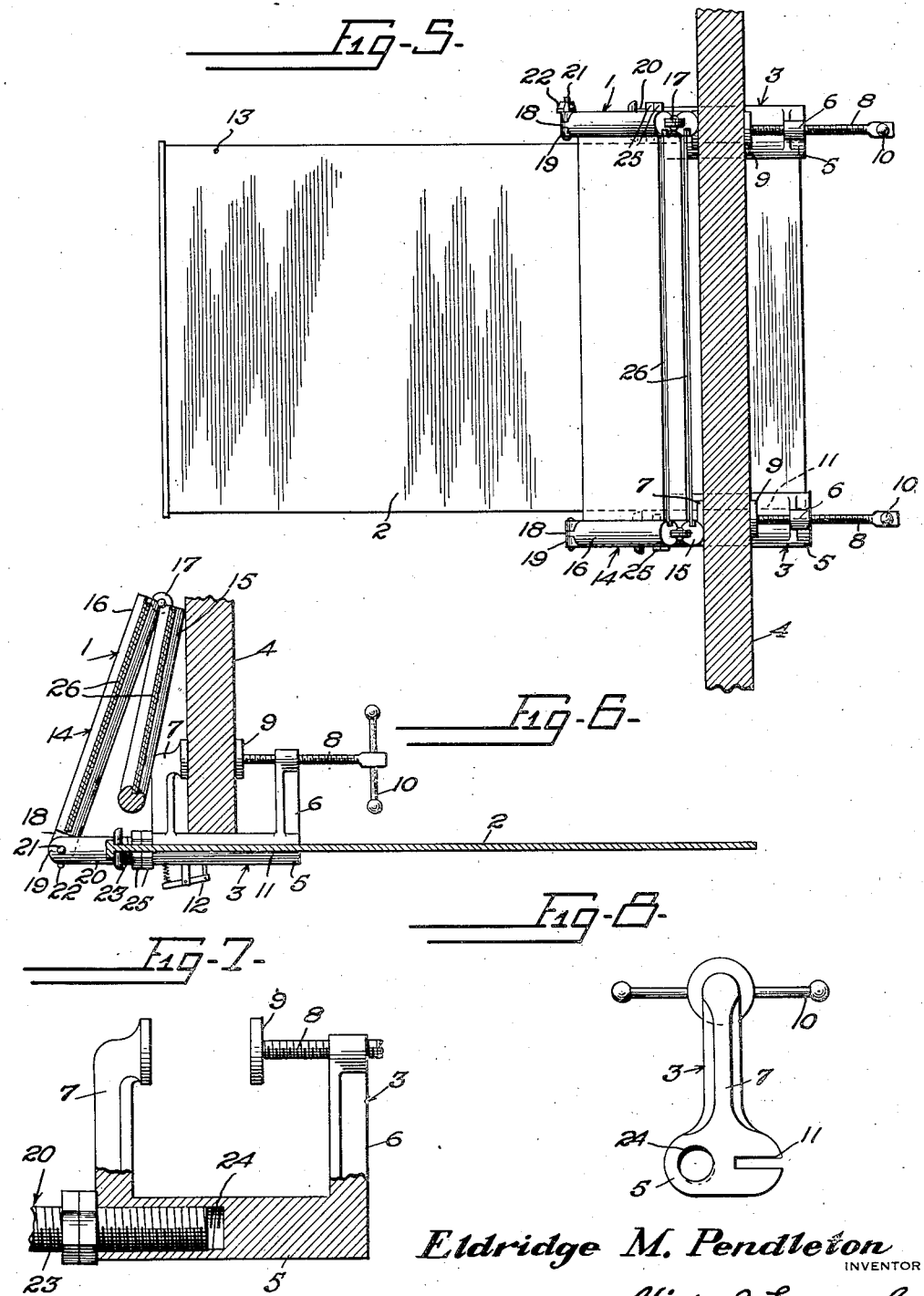
Eldridge M. Pendleton
INVENTOR
BY Victor J. Evans & Co.
ATTORNEY Patented Dec. 20, 1932

1,891,834

UNITED STATES PATENT OFFICE

ELDRIDGE M. PENDLETON, OF VICKSBURG, MISSISSIPPI

AUTOMOBILE LUNCH TABLE

Application filed April 15, 1932. Serial No. 605,536.

This invention relates to tables especially adaptable for automobiles, whereby the occupants thereof may rest refreshments or the like while eating and has for the primary object, the provision of a device of the above stated character which may be easily and quickly installed on a conventional type of automobile and which is capable of adjustment so as to assume a position out of the way of the occupants when in non-use and may be easily positioned in convenient reach of the occupants when desired.

Another object of this invention is the provision of brackets easily adjusted to the dash or instrument board of an automobile and constructed to support both foldable and slidable table elements whereby either of said elements may be placed in operative or inoperative positions.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating a table constructed in accordance with my invention.

Figure 2 is a side elevation partly in section illustrating the same.

Figure 3 is a view similar to Figure 2 showing one of the table elements in an operative position.

Figure 4 is a plan view partly in section illustrating the same.

Figure 5 is a plan view partly in section illustrating the foldable table element in an inoperative position with the slidable table element in an operative position.

Figure 6 is a sectional view taken on the line 6—6 of Figure 1.

Figure 7 is a detail sectional view illustrating the connection between the foldable table element and the clamp.

Figure 8 is an end elevation illustrating one of the clamps.

Referring in detail to the drawings, the numeral 1 indicates a foldable table element while the numeral 2 indicates a slidable table element. The table elements are carried by brackets 3 so designed as to grip the dash or instrument board 4 of an automobile whereby the foldable table element 1 may either occupy an inoperative position as shown in Figure 1 or an operative position as shown in Figure 4. The table element 2 when in an inoperative position underlies the instrument board or dash and between the latter and the cowl of the automobile entirely out of the way of the occupants in the automobile and may be slid outwardly to assume a position as shown in Figure 5 ready to support articles.

Each bracket 3 is similarly constructed and each includes a base 5 underlying the lower edge of the dash or instrument board and having formed thereon upstanding arms 6 and 7, the latter named arm engaging the front face of the dash or instrument board while the arm 6 is provided with a screw-threaded opening receiving a screw-threaded rod 8 provided at one end with a foot 9 bearing against the inner face of the dash or instrument board, the rod 8 at its other end being provided with a finger piece 10 to facilitate the adjustment of the clamp to the dash or instrument board. The base 5 is provided with a slot or groove 11 to slidably receive the table element 2, thus it will be seen that when the table element 2 is arranged in the grooves of the clamps it can be easily slid into either operative or inoperative position. One of the clamps upon its base 5 is provided with a pivotally mounted and spring pressed catch 12 adapted to engage in sockets 13 formed in the table element 2 for locking the latter either in its operative or inoperative position.

The table element 1 consists of a substantially U-shaped frame 14 including sections 15 and 16 connected together by hinges 17 whereby the section 15 may be folded upon the section 16 when desired. The free ends of the sections 16 are provided with apertured ears 18 hinging between pairs of apertured ears 19 on attaching elements 20. The ears 18 and 19 are hingedly connected and upon one side of the frame preferably by a bolt 21 having a wing nut 22 which will permit tensioning of the ears 18 and 19 upon one side of the frame for supporting the foldable table element either in operative or inoperative position. The attaching elements 20 are provided with screw-threaded portions 23 threaded into sockets 24 of the brackets 5 of the clamps and provided with lock nuts 25, thus it will be seen that either of the table elements may be easily and quickly adjusted to assume an operative position for supporting articles in easy reach of the occupants of an automobile and when disposed in an inoperative position will in no way interfere with the occupants. It is also to be noted that the means of attaching the table elements to the automobile may be easily and quickly accomplished without any alterations or injuring or marring the automobile and that the entire device may be removed from the automobile when desired.

The sections 15 and 16 of the frame 4 have formed in their opposing faces communicative grooves to receive panels 26 cooperating with each other and the frame in forming the table element.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A table for automobiles comprising a foldable frame, panels carried by said frame to form a table element, attaching elements hinged to said frame, and clamps detachably secured to said elements and to the instrument board of an automobile.

2. A table comprising supporting clamps having grooves in their opposing faces, a table element slidable in said grooves, a second table element pivoted to the clamps, said table elements capable of occupying inoperative positions out of the way of each other when one or the other of said table elements is positioned for use.

3. A table comprising supporting clamps applicable to the instrument board of an automobile, a table element slidably mounted on the clamps to occupy a position under the instrument board when in non-use and to occupy a position outwardly from the instrument board when in use, and a foldable table element pivoted to said clamps and when collapsed adapted to occupy a position out of the path of the first table element to permit the latter to move outwardly from the instrument board, said foldable table element movable into an operative position after the positioning of the first table element under the instrument board.

In testimony whereof I affix my signature.
ELDRIDGE M. PENDLETON.